United States Patent
Zhang et al.

(10) Patent No.: US 12,404,771 B1
(45) Date of Patent: Sep. 2, 2025

(54) ARTICULATED PRESTRESSING TENSIONING DEVICE FOR SHIELD TUNNELS AND REINFORCEMENT METHOD THEREOF

(71) Applicant: FUJIAN UNIVERSITY OF TECHNOLOGY, Fuzhou (CN)

(72) Inventors: Wei Zhang, Fuzhou (CN); Yiqun Huang, Fuzhou (CN); Bofeng Liu, Fuzhou (CN); Benqing Lin, Fuzhou (CN); Jinwei Lin, Fuzhou (CN)

(73) Assignee: FUJIAN UNIVERSITY OF TECHNOLOGY, Fuzhou (CN)

( * ) Notice: Subject to any disclaimer, the term of this patent is extended or adjusted under 35 U.S.C. 154(b) by 0 days.

(21) Appl. No.: 19/209,820

(22) Filed: May 16, 2025

(30) Foreign Application Priority Data

Jan. 23, 2025 (CN) .......................... 202510106690.7

(51) Int. Cl.
*E21D 11/08* (2006.01)
(52) U.S. Cl.
CPC .................................. *E21D 11/083* (2013.01)
(58) Field of Classification Search
CPC ..... E21D 11/08; E21D 11/083; E21D 11/186; E21D 11/385
USPC ........................................................ 405/153
See application file for complete search history.

(56) References Cited

FOREIGN PATENT DOCUMENTS

| | | | |
|---|---|---|---|
| CN | 111236991 A | 6/2020 | |
| CN | 114135312 A | * 3/2022 | ........... E21D 11/083 |
| CN | 115288727 A | 11/2022 | |
| CN | 218265091 U | 1/2023 | |
| CN | 114263485 B | 4/2024 | |
| CN | 118728420 A | * 10/2024 | ............ E21D 11/08 |
| CN | 119145877 A | 12/2024 | |
| JP | H09324598 A | 12/1997 | |
| KR | 20120063257 A | 6/2012 | |

* cited by examiner

*Primary Examiner* — Frederick L Lagman
(74) *Attorney, Agent, or Firm* — Bayramoglu Law Offices LLC

(57) ABSTRACT

A prestressed tensioning device and a reinforcement method that is suitable for shield tunnels, pertaining to the technical field of shield tunnel construction and reinforcement technology. The device comprises: two sets of reinforcement components, wherein the reinforcement components are arranged opposite each other; a prestressing component disposed between the two sets of reinforcement components; and a prestressing rod disposed within the prestressing component. The prestressing rod is subjected to prestress tensioning by the prestressing component, wherein both ends of the prestressing rod extend beyond the prestressing component. Both ends of the prestressing rod are connected to the two sets of reinforcement components via high-strength nuts. The present invention utilizes an articulated structure, enabling the reinforcement components to adapt to handhole angles of tunnel segments with varying diameters, and is suitable for application within confined and smooth annular structures.

5 Claims, 4 Drawing Sheets

ARTICULATED PRESTRESSING TENSIONING DEVICE FOR SHIELD TUNNELS AND REINFORCEMENT METHOD THEREOF

CROSS REFERENCE TO RELATED APPLICATION

This application is based upon and claims foreign priority to Chinese Patent Application No. 202510106690.7, filed on Jan. 23, 2025, the entire content of which is incorporated herein by reference.

TECHNICAL FIELD

The present invention relates to the technical field of shield tunnel construction and reinforcement, and more particularly to an articulated prestressing tensioning device for shield tunnels and a reinforcement method thereof.

BACKGROUND

In the field of shield tunnel construction and reinforcement, the prestressing reinforcement method is an important means to improve the structural performance of tunnel segments. Currently, there are mainly two technical routes: prestressed supports and external prestressing tensioning devices. Among them, prestressed supports enhance the rigidity of the segments by applying prestress, but their large volume and weight occupy construction space, and their operational convenience is greatly limited, especially under the limited construction conditions inside the tunnel. In addition, prestressed supports usually cause a certain degree of interference to subsequent water and electricity construction, thereby affecting project efficiency and construction progress.

In contrast, external prestressing tensioning devices mostly adopt the post-tensioning method to apply prestress, which transmits the prestress to the structure through subsequent tensioning operations to achieve the purpose of reinforcement. However, in the narrow and smooth annular structure of shield tunnels, external prestressing tensioning devices are inconvenient to construct on the upper part of the annulus where manual climbing is difficult, and it is difficult to adapt to the construction requirements of different tunnel diameters and manhole angles, resulting in low applicability.

For example, the prestressed support technology disclosed in invention patent CN114263485B can effectively improve the rigidity of tunnel segments, but it requires the arrangement of multiple steel supports, occupying a large amount of space, limiting the scope of construction operations, and adversely affecting subsequent construction links such as the layout of water and electricity systems. The limitations of using such devices are particularly prominent inside narrow shield tunnels.

As another example, invention patent CN119145877A discloses an external bolt prestressing tensioning device suitable for tunnel segment joints. This device adopts the post-tensioning method to apply prestress, but its convenience is poor when constructing in areas such as the upper part of the annulus where manual operation is difficult. In addition, this device adopts an integrated molding design and cannot be adjusted to adapt to the manhole angles of tunnels with different diameters, thereby limiting its application in various scenarios.

Therefore, how to provide an articulated prestressing tensioning device for shield tunnels and a reinforcement method thereof that is suitable for areas where manual operation is inconvenient, thereby significantly improving construction efficiency and equipment versatility, is a technical problem that urgently needs to be solved by those skilled in the art.

SUMMARY

In view of this, the present invention provides an articulated prestressing tensioning device for shield tunnels and a reinforcement method thereof, aiming to solve one of the problems in the above background art, which is suitable for areas where manual operation is inconvenient, thereby significantly improving construction efficiency and equipment versatility.

To achieve the above objective, the present invention adopts the following technical solutions:

An articulated prestressing tensioning device for shield tunnels, comprising:

Reinforcement assemblies, wherein two sets of the reinforcement assemblies are provided opposite to each other;

A prestressing pre-tensioning assembly, wherein the prestressing pre-tensioning assembly is arranged between the two reinforcement assemblies;

A prestressing threaded rod, wherein the prestressing threaded rod is arranged within the prestressing pre-tensioning assembly, the prestressing threaded rod completes prestressing tensioning on the prestressing pre-tensioning assembly, both ends of the prestressing threaded rod extend beyond the prestressing pre-tensioning assembly, and both ends of the prestressing threaded rod are connected to the two sets of reinforcement assemblies through high-strength nuts.

Further, each set of the reinforcement assembly includes a connecting rod reaction block, an car plate with holes, and a connecting rod, the connecting rod reaction block is rotatably arranged on the car plate with holes through the connecting rod, the end of the prestressing threaded rod is connected to the connecting rod reaction block through a high-strength nut, and the car plate with holes is fixed to the shield tunnel segment by segment bolts.

Further, the prestressing pre-tensioning assembly includes clamping steel plates and fixing bolts, two clamping steel plates are provided, each clamping steel plate is provided with reserved screw holes, the prestressing threaded rod is arranged between the two clamping steel plates, and the prestressing threaded rod is connected to the clamping steel plates through wedge-shaped clamps.

Further, one end of the two clamping steel plates close to each other is provided with a clamping groove, and the prestressing threaded rod is arranged in the clamping groove.

Further, two prestressing threaded rods are provided, the two prestressing threaded rods are arranged in parallel between the two clamping steel plates, each prestressing threaded rod is connected to the clamping steel plates through wedge-shaped clamps, and the end of each prestressing threaded rod is connected to the connecting rod reaction block through a high-strength nut.

Further, it also includes fixing bolts, and the two clamping steel plates are detachably connected through the fixing bolts.

A reinforcement method using the articulated prestressing tensioning device for shield tunnels, specifically including the following steps:

Step 1: Clamp the prestressing threaded rod with two clamping steel plates, and lock the two clamping steel plates with fixing bolts;

Step 2: Both ends of the prestressing threaded rod are fixed between the two clamping steel plates through wedge-shaped clamps, use a center-hole hydraulic jack to abut against the clamping steel plates to perform prestressing tensioning operation on the prestressing threaded rod, at the same time, the wedge-shaped clamps complete the prestress holding of the prestressing threaded rod through their unique wedge-shaped structure, and the prestressing tensioning is completed;

Step 3: After the prestressing tensioning is completed, the end of each prestressing threaded rod is connected to the connecting rod reaction block through a high-strength nut, and the car plate with holes is fixed to the shield tunnel segment by segment bolts, and the articulated prestressing tensioning device is installed;

Step 4: Loosen the fixing bolts, so that the prestress is transmitted to the reinforcement components through the locked high-strength nuts, and the reinforcement is completed.

Through the above technical solutions, compared with the prior art, the present invention discloses an articulated prestressing tensioning device for shield tunnels and a reinforcement method thereof. By completing prestressing tensioning on the prestressing pre-tensioning assembly with the prestressing threaded rod, and then connecting the prestressing pre-tensioning assembly and the reinforcement assembly with high-strength nuts, efficient reinforcement of the shield tunnel is achieved. By adopting the design of an car plate with holes and a connecting rod reaction block, the problem of poor adaptability of the reinforcement assembly is solved. The combination of wedge-shaped clamps and a center-hole hydraulic jack significantly improves the operational stability and uniform force distribution of prestressing tensioning, effectively solving the problem of eccentric force in the prestress application process, thereby improving the construction quality and safety of the shield tunnel.

BRIEF DESCRIPTION OF THE DRAWINGS

In order to more clearly illustrate the technical solutions in the embodiments of the present invention or the prior art, the accompanying drawings required for the description of the embodiments or the prior art will be briefly introduced below. Obviously, the accompanying drawings in the following description are merely some embodiments of the present invention. For those skilled in the art, other drawings can be obtained based on the provided drawings without any creative effort.

Wherein: 1 is an ear plate with holes; 2 is a connecting rod reaction block; 3 is a clamping steel plate; 4 is a reserved screw hole; 5 is a fixing bolt; 6 is a prestressing threaded rod; 7 is a high-strength nut; 8 is a connecting rod; 9 is a segment bolt; 10 is a wedge-shaped clamp; 11 is a clamping groove.

DETAILED DESCRIPTION OF THE EMBODIMENTS

The technical solutions in the embodiments of the present invention will be clearly and completely described below in conjunction with the accompanying drawings of the embodiments of the present invention. Obviously, the described embodiments are merely some embodiments of the present invention, and not all embodiments. Based on the embodiments in the present invention, all other embodiments obtained by those skilled in the art without any creative effort shall fall within the protection scope of the present invention.

Figure 1:
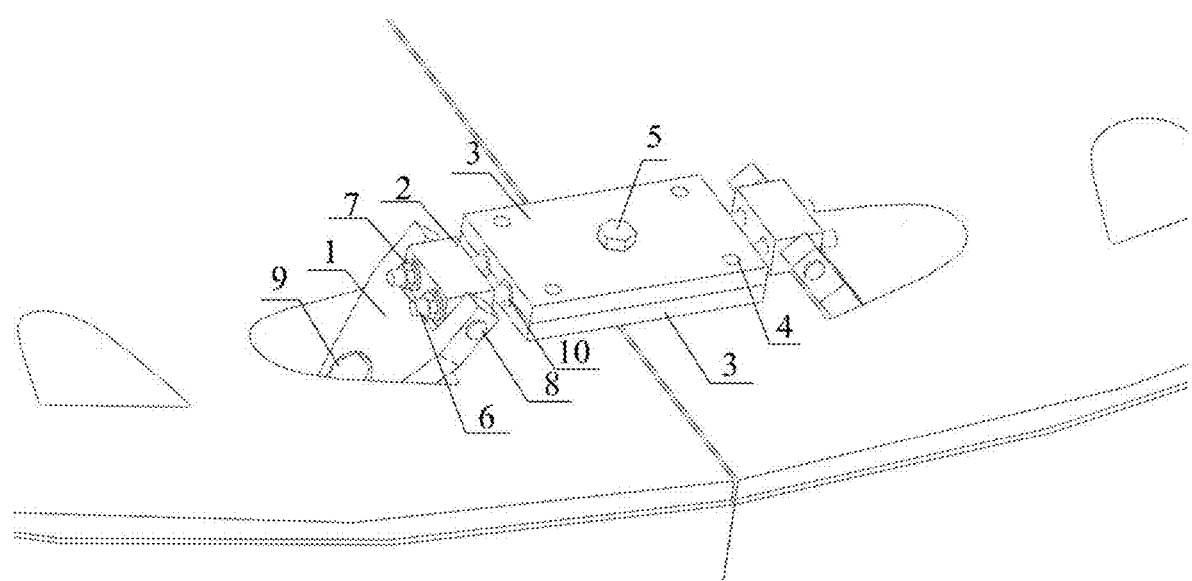
FIG. 1 is a schematic structural diagram of the articulated prestressing tensioning device for shield tunnels provided by the present invention.
Figure 2:
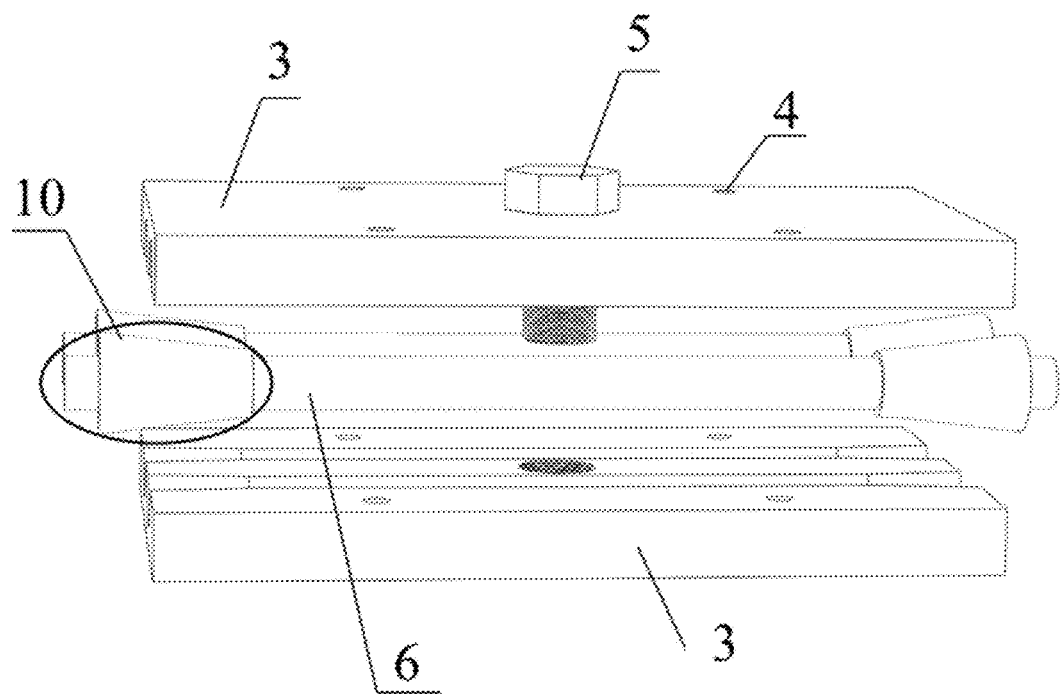
FIG. 2 is a schematic structural diagram of the prestressing pre-tensioning assembly provided by the present invention.
Figure 3:
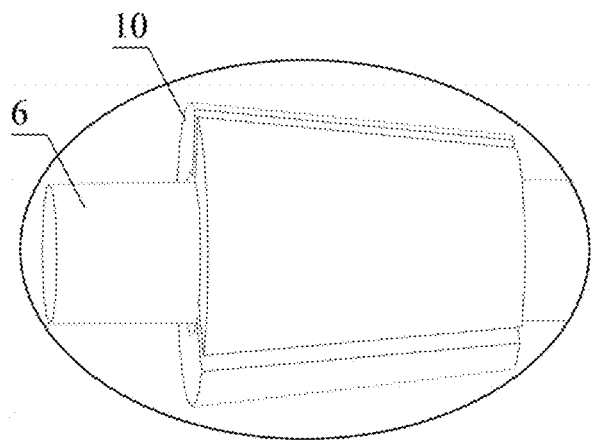
FIG. 3 is a schematic diagram of the connection between the prestressing threaded rod and the wedge-shaped clamp provided by the present invention.
Figure 4:
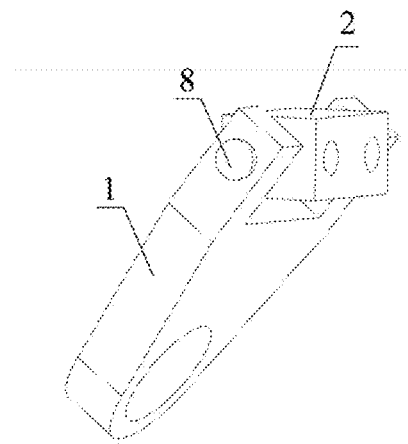
FIG. 4 is a schematic structural diagram of the reinforcement assembly provided by the present invention.
Figure 5:
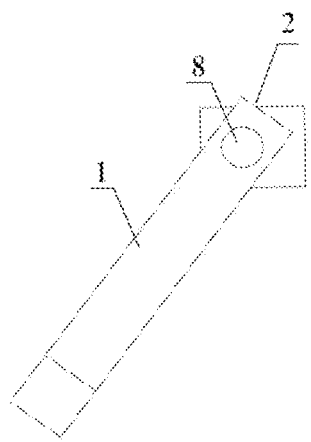
FIG. 5 is a front view of the reinforcement assembly provided by the present invention.
Figure 6:
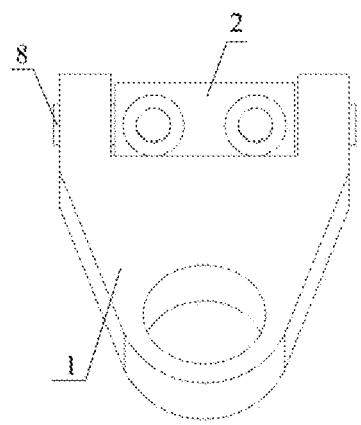
FIG. 6 is a left view of the reinforcement assembly provided by the present invention.
Figure 7:
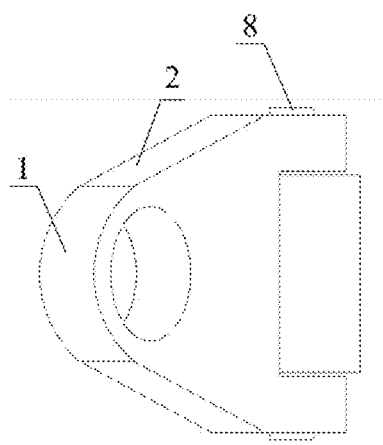
FIG. 7 is a bottom view of the reinforcement assembly provided by the present invention.
Figure 8:
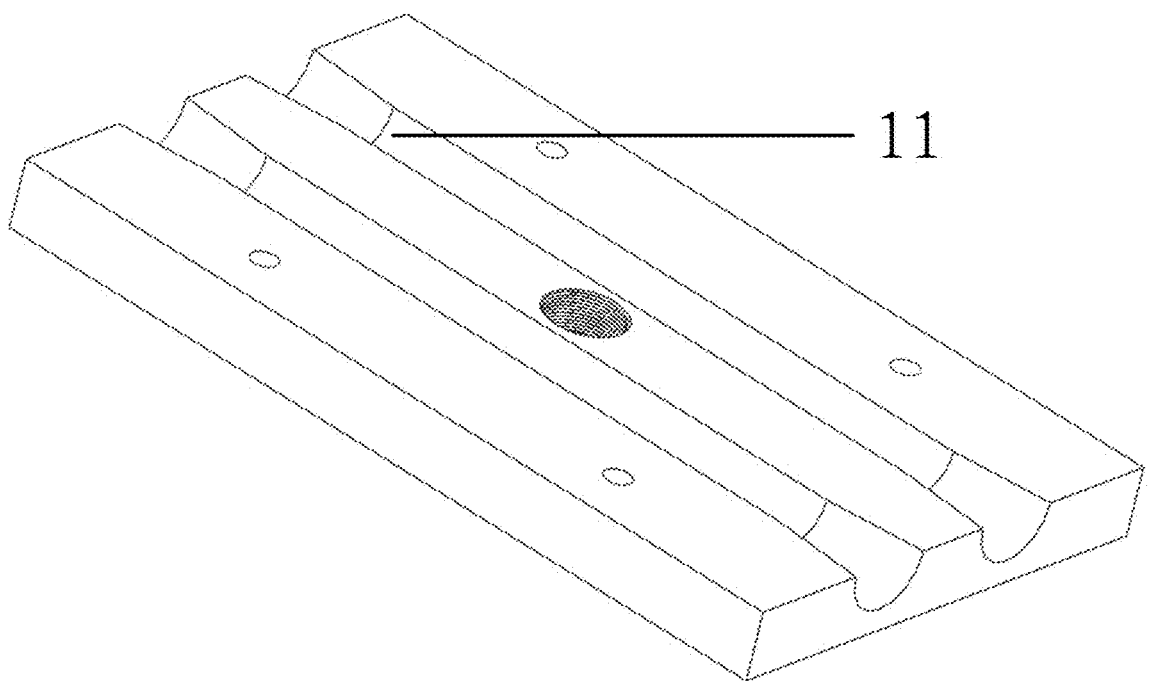
FIG. 8 is a schematic structural diagram of the clamping steel plate provided by the present invention.
Figure 9:
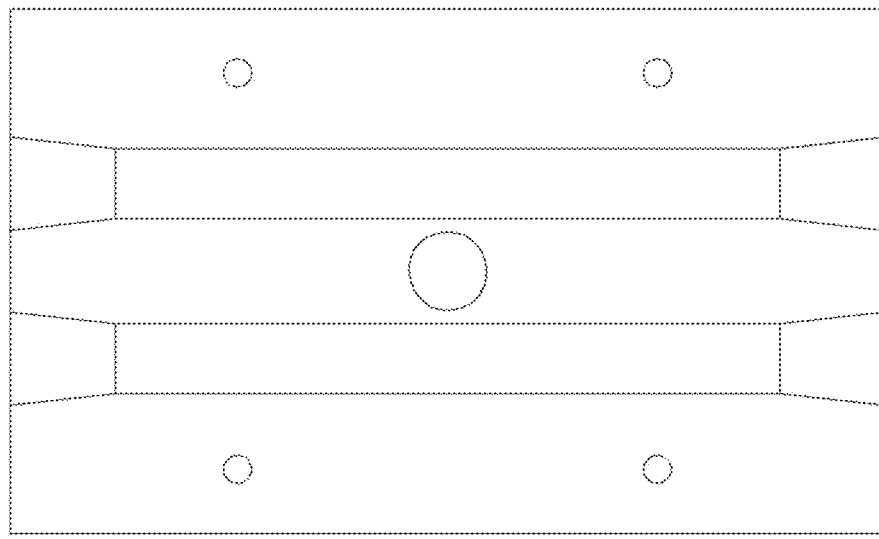
FIG. 9 is a top view of the clamping steel plate provided by the present invention.
Figure 10:
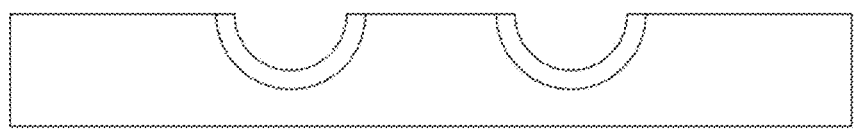
FIG. 10 is a left view of the clamping steel plate provided by the present invention.
Figure 11:
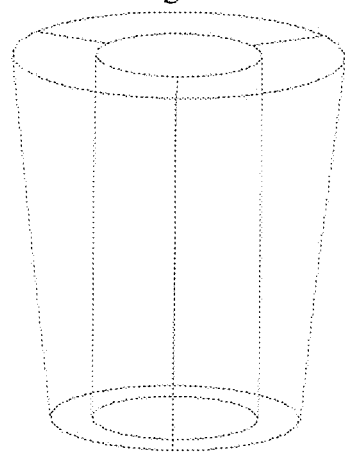
FIG. 11 is a schematic structural diagram of the wedge-shaped clamp provided by the present invention.

Referring to FIGS. 1-11, an articulated prestressing tensioning device for shield tunnels disclosed in an embodiment of the present invention includes:

Reinforcement assemblies, wherein two sets of reinforcement assemblies are provided opposite to each other;

A prestressing pre-tensioning assembly, wherein the prestressing pre-tensioning assembly is arranged between the two reinforcement assemblies; the reinforcement assemblies can cooperate with the prestressing pre-tensioning assembly to reinforce the shield tunnel;

A prestressing threaded rod 6, wherein the prestressing threaded rod 6 is arranged within the prestressing pre-tensioning assembly, the prestressing threaded rod 6 completes prestressing tensioning on the prestressing pre-tensioning assembly, both ends of the prestressing threaded rod 6 extend beyond the prestressing pre-tensioning assembly, and both ends of the prestressing threaded rod 6 are connected to the two sets of reinforcement assemblies through high-strength nuts 7; the prestressing threaded rod 6 completes prestressing tensioning on the prestressing pre-tensioning assembly, and then the prestressing pre-tensioning assembly and the reinforcement assemblies are connected through high-strength nuts 7, the high-strength nuts 7 can quickly lock the connection, ensuring long-term stability after prestress application.

In this embodiment, each set of the reinforcement assembly includes a connecting rod reaction block 2, an car plate with holes 1, and a connecting rod 8, the connecting rod reaction block 2 is rotatably arranged on the car plate with holes 1 through the connecting rod 8, the end of the prestressing threaded rod 6 is connected to the connecting rod reaction block 2 through a high-strength nut 7, and the car plate with holes 1 is fixed to the shield tunnel segment by segment bolts 9; the connecting rod reaction block 2 rotates around the car plate with holes 1 as a fixed end through the connecting rod 8, so that the reinforcement assembly can adapt to various different segment manhole angles and effectively solve the problem of eccentric force in the prestress application process, the connecting rod reaction block 2 uniformly transmits the prestress to the shield tunnel segment through its articulated characteristics, further enhancing the circumferential and longitudinal rigidity of the shield tunnel segment; the articulated structure can effectively adjust the installation angle during the construction process, avoiding installation difficulties caused by mismatched manhole positions, and adapting to various shapes and specifications of shield tunnel segments.

In this embodiment, the prestressing pre-tensioning assembly includes clamping steel plates 3 and fixing bolts 5, two clamping steel plates 3 are provided, each clamping steel plate 3 is provided with reserved screw holes 4, the prestressing threaded rod 6 is arranged between the two clamping steel plates 3, and the prestressing threaded rod 6 is connected to the clamping steel plates 3 through wedge-shaped clamps 10; screws can be selectively screwed into the reserved screw holes 4 to provide better fixation.

In this embodiment, one end of the two clamping steel plates 3 close to each other is provided with a clamping groove 11, and the prestressing threaded rod 6 is arranged in the clamping groove 11; this better fixes the prestressing threaded rod 6.

In this embodiment, two prestressing threaded rods 6 are provided, the two prestressing threaded rods 6 are arranged in parallel between the two clamping steel plates 3, each prestressing threaded rod 6 is connected to the clamping steel plates 3 through wedge-shaped clamps 10, and the end of each prestressing threaded rod 6 is connected to the connecting rod reaction block 2 through a high-strength nut 7; the wedge-shaped clamp 10 has a unique wedge-shaped structure, and after the tensioning force is applied by the center-hole hydraulic jack, the wedge-shaped clamp 10 can firmly hold the prestress, ensuring reliable transmission of the tensioning force.

In this embodiment, it also includes fixing bolts 5, and the two clamping steel plates 3 are detachably connected through the fixing bolts 5.

A reinforcement method using the articulated prestressing tensioning device for shield tunnels, specifically including the following steps:

Step 1: Clamp the prestressing threaded rod 6 with two clamping steel plates 3, and lock the two clamping steel plates 3 with fixing bolts 5;

Step 2: Both ends of the prestressing threaded rod 6 are fixed between the two clamping steel plates 3 through wedge-shaped clamps 10, use a center-hole hydraulic jack to abut against the clamping steel plates 3 to perform prestressing tensioning operation on the prestressing threaded rod 6, at the same time, the wedge-shaped clamps 10 complete the prestress holding of the prestressing threaded rod 6 through their unique wedge-shaped structure, and the prestressing tensioning is completed;

Step 3: After the prestressing tensioning is completed, the end of each prestressing threaded rod 6 is connected to the connecting rod reaction block 2 through a high-strength nut 7, and the car plate with holes 1 is fixed to the shield tunnel segment by segment bolts 9, and the articulated prestressing tensioning device is installed;

Step 4: Loosen the fixing bolts 5, so that the prestress is transmitted to the reinforcement components through the locked high-strength nuts 7, and the reinforcement is completed.

In addition, in this embodiment, considering the high humidity and corrosive environment inside the shield tunnel, the prestressing threaded rod 6 adopts a high-strength steel threaded rod and is treated with an anti-corrosion coating, or a composite material threaded rod is selected to significantly improve its corrosion resistance and long-term stability, thereby ensuring the service life of the device.

Reserved threaded holes on the clamping steel plate 3, through the cooperation of the threaded holes and the fixing bolts 5, can quickly complete the assembly of the components and improve construction efficiency.

The various embodiments in this specification are described in a progressive manner, with each embodiment focusing on describing the differences from other embodiments, and the same or similar parts between the various embodiments can be referred to each other. As for the disclosed device, since it corresponds to the disclosed method, the description is relatively simple, and the relevant parts can refer to the description of the method.

The above description of the disclosed embodiments enables those skilled in the art to implement or use the present invention. Various modifications to these embodiments will be readily apparent to those skilled in the art, and the general principles defined herein may be implemented in other embodiments without departing from the spirit or scope of the invention. Therefore, the present invention will not be limited to the embodiments shown herein, but shall conform to the widest scope consistent with the principles and novel features disclosed herein.

What is claimed is:

1. An articulated prestressed tensioning device suitable for shield tunnels, comprising:
    two sets of reinforcement components, wherein the reinforcement components are arranged opposite each other;
    a prestressing component disposed between the two sets of the reinforcement components;
    a prestressing rod disposed within the prestressing component, wherein the prestressing rod is subjected to prestress tensioning by the prestressing component, wherein both ends of the prestressing rod extend beyond the prestressing component, and wherein both ends of the prestressing rod are connected to the two sets of the reinforcement components via high-strength nuts;
    wherein each set of the reinforcement components comprises: a connecting rod reaction block, a lug plate with holes or apertures, and a connecting rod; wherein the connecting rod reaction block is rotatably mounted on the lug plate via the connecting rod, wherein an end of the prestressing rod is connected to the connecting rod reaction block via a high-strength nut, and wherein the lug plate is configured to be fixed to a shield tunnel segment via segment bolts;
    wherein the prestressing component comprises: two clamping steel plates, each of the clamping steel plates being provided with pre-drilled screw holes, comprising reserved screw holes; wherein the prestressing rod is disposed between the two clamping steel plates, and wherein the prestressing rod is connected to the clamping steel plates via wedge grips.

2. The articulated prestressed tensioning device according to claim 1, wherein mutually facing ends of the two the clamping steel plates are provided with clamping grooves, and wherein the prestressing rod is disposed within the clamping grooves.

3. The articulated prestressed tensioning device according to claim 2, wherein two prestressing rods are provided, the two prestressing rods are arranged in parallel between the two clamping steel plates, each of the two prestressing rods is connected to the clamping steel plates via wedge grips, and an end of each of the two prestressing rods is connected to the connecting rod reaction block via a high-strength nut.

4. The articulated prestressed tensioning device according to claim 3, further comprising fixing bolts, wherein the two clamping steel plates are detachably interconnected by the fixing bolts.

5. A reinforcement method using the articulated prestressed tensioning device suitable for shield tunnel segment(s) according to claim 4, further comprising the following steps:

Step one: clamping the prestressing rods using the two clamping steel plates and securing the two clamping steel plates together using the fixing bolts;

Step two: placing a center-hole jack against the clamping steel plates and performing a prestress tensioning operation on the prestressing rods using the jack, wherein during tensioning, the wedge grips automatically engage due to their inherent wedge structure to maintain the prestress load on the prestressing rods, thereby completing the prestress tensioning;

Step three: after completing the prestress tensioning, connecting the ends of each prestressing rod to the respective connecting rod reaction blocks using the high-strength nuts, and fixing the lug plates associated with the reaction blocks to the shield tunnel segment(s) using segment bolts, thereby completing the installation of the articulated prestressed tensioning device;

Step four: loosening or removing the fixing bolts connecting the two clamping steel plates, thereby allowing the prestress force held within the prestressing rods to be transferred through the secured high-strength nuts to the reinforcement components comprising the connecting rod reaction blocks and the lug plates, thus completing the reinforcement process.

* * * * *